United States Patent [19]

Mouchart et al.

[11] Patent Number: 4,966,438
[45] Date of Patent: Oct. 30, 1990

[54] DIELECTRIC LAYER POLARIZER

[75] Inventors: Jacques Mouchart, L'Hay les Roses; Jacqueline Begel, Montlhery; Eugène Duda, Villebon sur Yvette, all of France

[73] Assignee: Societe Anonyme dite: Alcatel Cit, Paris, France

[21] Appl. No.: 333,151

[22] Filed: Apr. 4, 1989

[30] Foreign Application Priority Data

Apr. 8, 1988 [FR] France ................ 88 04671

[51] Int. Cl.⁵ ............... G02B 27/10; G02B 5/28; G02B 1/10; G02B 27/28
[52] U.S. Cl. ............. 350/173; 350/164; 350/166
[58] Field of Search ........... 350/166, 173, 394, 164, 350/395, 170, 402, 401, 370, 286

[56] References Cited

U.S. PATENT DOCUMENTS

| | | | |
|---|---|---|---|
| 2,399,860 | 5/1946 | Dimmick | 350/164 |
| 2,403,731 | 7/1946 | MacNeille | 350/394 |
| 2,742,819 | 4/1956 | Koch et al. | 350/166 |
| 4,145,113 | 3/1979 | Ranninger et al. | 350/166 |
| 4,627,688 | 12/1986 | Kobayashi et al. | 350/173 |
| 4,770,496 | 9/1988 | Mahlein | 350/166 |

OTHER PUBLICATIONS

"Some Applications of Thin Films to Polarization Devices", P. B. Clapham, M. J. Downs, and R. J. King, Applied Optics, vol. 8, No. 10, Oct. 1969 pp. 1965–1974, 350–166.

Banning, M. "Practical methods of making an using multilayer filters", J. Opt. Soc. Am., 37, pp. 792–797 (1947).

Macleod, H. A. Thin Film Optical Filters, second edition, Macmillan Publishing Company (1986), pp. 328–333.

Netterfield, R. P. "Practical Thin Film Polarizing Beam-Splitters", Optica Acta, 24, pp. 69–79 (1977).

Mouchart, J. "Optical Coatings of Periodic Structure. I: Characteristic Functions", Appl. Opt. 20, pp. 4201–4026 (1986).

Herpin, A., C. R. Acad. Sci. 225, p. 182 (1947).

Primary Examiner—Bruce Y. Arnold
Assistant Examiner—David R. Parsons
Attorney, Agent, or Firm—Sughrue, Mion, Zinn, MacPeak & Seas

[57] ABSTRACT

The invention relates in particular to polarizing light whose angle of incidence may vary substantially, e.g. over ±10°. A polarizing stack (22) constituted by dielectric layers (30, 31, 32, 33, 34, ...) is formed on an oblique face (4). It is in the form of a repetitive sucession of symmetrical sequences (30, 31, 40) each constituted by two half-thickness low refractive index layers (30, 40) on either side of a high refracture index layer (31). The invention is particularly applicable to polarizing the light emitted by a semiconductor laser.

6 Claims, 3 Drawing Sheets

DIELECTRIC LAYER POLARIZER

The present invention relates to a polarizer, (i.e.) (and more particularly) a device suitable, on receiving a light beam which is not polarized or which is polarized in an arbitrary direction, for splitting the beam into two output beams which are linearly polarized along two predetermined different directions.

BACKGROUND OF THE INVENTION

Dielectric layer polarizers of the polarizing cube type have been well known in optics for about 40 years.

They were invented by MacNeille and manufactured by Banning. They direct the two s and p components of the incident light beam along two perpendicular directions of propagation. These components are such that the direction of the vibration of the electric field are respectively perpendicular and parallel to the plane of incidence of the beam. Such polarizers make use of the fact that reflection and transmission of light through a stack of thin layers deposited on a support through which the incident light passes at an oblique angle of incidence are different depending on the direction of vibration of the light.

Such a polarizer is made in the form of a cube which is generally made of glass and which is cut along a plane passing through two opposite edges in order to reveal two facing oblique faces referred to as hypothenuse faces. At least one of these faces is coated with a polarizing stack. The angle of each of the two prisms constituted by the cube is 45°, and as a result the prisms must be glued together by their hypothenuse faces in order to avoid total internal reflection of the light on one of these faces inside the cube. The inlet and outlet faces of the cube are generally given antireflection treatment.

The polarizing stack is generally constituted by alternating layers of low and high index $n_H$ and $n_N$. The literature (see documents 1 to 4) specifies the conditions that must be satisfied by the refractive indices of the deposited layers and the refractive index $n_O$ of the substrate constituted by the prism(s) carrying the layers in order to ensure that the optical thickness of the layers is indeed quarterwave oblique incidence.

The thickness of a layer is said to be quarterwave for light of a given wavelength received at a given angle of incidence when the two fractions of the light reflected by the two faces of the layer are antiphase. A layer of half that thickness is said to be one eighth of a wavelength thick.

In order to be effective, it is necessary for the transmittance $T_p$ of the p vibration through a polarizer to be close to unity while its transmittance $T_s$ of the s vibration is practically zero. Nowadays, a good polarizer should have transmittance $T_p$ of at least 0.97 and transmittance $T_s$ of less than $10^{-2}$, thereby providing relative attenuation of the s vibration of at least 20 dB.

Multidielectric layer polarizers are known which are effective over a wide range of the spectrum. Unfortunately, they are effective only over a small range of angles, typically less that ±2° about the normal incidence to the front face of the polarizing cube. More precisely, an insertion loss of more than 0.5 dB is observed for the p vibration once the angle of incidence on the front face of the polarizer exceeds 2°. Such loss is excessive.

A particular object of the present invention is to provide a dielectric layer polarizer which avoids excessive transmission loss of the p vibration when the angle of incidence of the beam to be polarized varies over more than 2° while the spectrum width of the beam is limited. Another object of the invention is to provide polarizers which are effective over a wide range of angles, about ±10°, or light which is substantially monochromatic. Such polarizers may be referred to as wide angle polarizers.

Possible applications of wide angle polarizers include polarizing a beam of infrared light from a semiconductor lazer emitting at a wavelength of 1.3 microns ($\mu$m) or 1.55 $\mu$m. Such a beam has the advantage of being monochromatic. However it also suffers from the drawback of having a divergence of several degrees. If a convention MacNeille type polarizer is used, it is necessary to add a lens system for collimating the laser beam prior to passing it through the polarizer. The use of wide angle polarizer means that the collimator can be omitted, thereby giving an assembly which is cheaper, more compact, and which minimizes insertion losses.

SUMMARY OF THE INVENTION

In the context of the above-mentioned objects, the present invention provides a dielectric layer polarizer comprising a stack of alternating low and high refractive index dielectric layers on an oblique face of a substrate, wherein said stack is symmetrical and begins and ends with respective half-thickness layers having the same refractive index.

In greater detail, the present invention provides, in particular, a dielectric layer polarizer for polarizing light having a wavelength, said polarizer comprising:

inlet means for forming or transmitting an incident beam which is constituted by said light and whose rays progagate along directions close to a predetermined direction of incidence;

a transparent substrate having a face on the path of said incident beam, said face being oblique relative to said direction of incidence; and a polarizing stack formed on said oblique face and constituted by thin dielectric layers, said layers being first and second refractive index polarizing layers presenting a first refractive index and a second refractive index for said light and following one another in alternation starting from said oblique face and having different thicknesses, with the succession of said layers being in the form of a periodic succession of base sequences, each of which is constituted by a plurality of thin dielectric layers alternating between said first and second refractive, said sequences being identical to each other with respect to their refractive indices and the thicknesses of the layers which constitute them;

said direction of incidence forming an angle of incidence with the direction perpendicular to said oblique face and to said polarizing layers, said angle of incidence being situated in a plane of incidence and having a value relative to said wavelength and to said refractive indices and thicknesses of the polarizing layers such that said polarizing stack separates said incident beam into a transmitted beam and a reflected beam with crossed polarizations;

wherein said base sequence is a symmetrical sequence constituted by one of said second refractive index polarizing layers having a second refractive index optical thickness and two mutally identical half-thickness first refractive index layers situated on either side of said second index layer and each of them having a first index optical thickness, such that pairs of said half-thickness first index layers combine at each interface between two consecutive base sequences in order to form one of said first index polarizing layers which is of full thickness.

As a result, said polarizing stack forms a symmetrical succession of said polarizing layers. This succession begins and ends with two of said half-thickness first-index layers, and it is constituted in between by said full thickness second index and first index polarizing layers which alternate and which begin and end with a second index layer.

Under suitable circumstances, certain preferred dispositions may also be adopted with the invention. According to one of these dispositions, when said first and second indices are respectively low and high, a base thickness W is given in terms of a low index proportion P, by the equation:

$$1/W = 1.92 - 0.77P;$$

said base thickness W comprising a total relative thickness $W_1 W_0$ and being equal to the ratio of the total optical thickness $W_1 = 2ne_B + ne_H$ of said base sequence divided by a reference thickness $W_0$; where $ne_B$ and $ne_H$ are the respective optical thicknesses of the high and low refractive index layers in the base sequence of the polarizer;

said low index proportion P being a relative proportion $P_1/P_0$ of the low index optical thicknesses deduced from the total proportion $P_1 = 2ne_B/[2ne_B + ne_H]$ of the optical thicknesses $2ne_B$ of said low index layers in the optical thickness $[2ne_B + ne_H]$ of said sequence, and being equal to the ratio $P_1/P_0$ of said total proportion $P_1$ divided by a reference proportion $P_0$;

said reference thickness $W_0$ and said reference proportion $P_0$ being defined on a reference polarizer which is one of said dielectric layer polarizers in which said high index polarizing layer and said full thickness low index polarizing layer are quarterwave layers for said light and for said angle of incidence $A_0$, said reference thickness $W_0$ and said rerference proportion $P_0$ being the total optical thickness $[2ne_{B0} + ne_{H0}]$ and the total proportion of the low index optical thicknesses $2ne_{B0}/[2ne_{B0} + ne_{H0}]$, respectively, in said base sequence of said reference polarizer.

The above-mentioned equation may be used as follows when the polarizing stack of the reference polarizer is embedded in a transparent block having a refractive index $n_0$. The materials for said low and high index polarizing layers are selected, thus selecting their refractive indices $n_B$ and $n_H$ respectively. Said angle of incidence $A_0$ is also selected. The optimum thicknesses of said full thickness low index polarizing layers $2ne_{B0}$ and of said quarter wave high index layers are then obtained by multiplying said wavelength by the following factors respectively:

$$0.25(1 - n_0^2 \sin^2 A_0/n_B^2)^{-\frac{1}{2}} \text{ and}$$

$$0.25(1 - n_0^2 \sin^2 A_0/n_H^2)^{-\frac{1}{2}}$$

Once these thicknesses have been calculated, said reference thickness and said reference proportion are given by the following equations:

$$W_0 = 2ne_{B0} + ne_{H0}$$

$$P_0 = 2ne_{B0}/W_0$$

On the basis of these values, the choice of a low index relative proportion P defines a base relative thickness W, and thus the optical thicknesses $2ne_B$ and $ne_H$ of the polarizing layers, i.e. the base sequence is fully defined.

According to two other ones of said preferred dispositions, said low index proportion P lies in the range 0.8 to 1.5 and said angle of incidence $A_0$ lies in the range 20° to 70°.

BRIEF DESCRIPTION OF THE DRAWINGS

An implementation of the present invention within the context of the above description is described in greater detail below by way of non-limiting example and with reference to the accompanying diagrammatic figures. When the same item appears in several of the figures, it is designated by the same reference symbol in all of them. The implementation described by way of example includes the above-mentioned preferred dispositions. It should be understood that the items mentioned may be replaced by other items providing the same technical functions.

DETAILED DESCRIPTION

Figure 1:
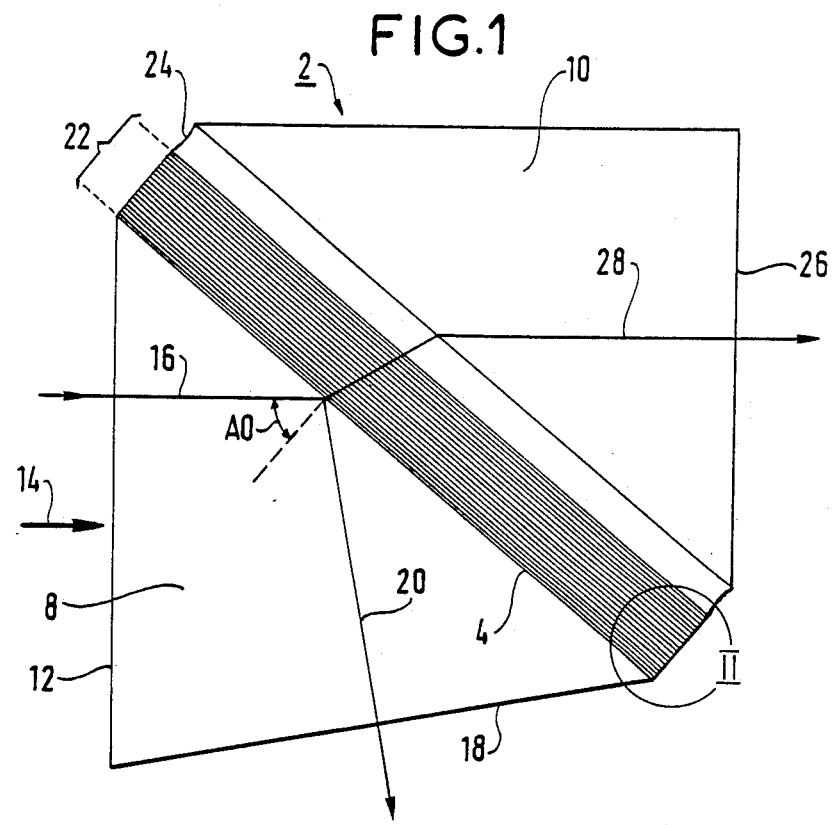
FIG. 1 is a section through a polarizer in accordance with the invention.

As shown in FIG. 1, the polarizer given by way of example comprises:

an inlet face 12 substantially perpendicular to said direction of incidence 14 in order to constitute said inlet means transmitting said incident beam 16 into said block;

a transmission outlet face 26 situated on the path of said transmitted beam 28; and a reflection outlet face 18 situated on the path of said reflected beam 20;

with at least one of said outlet faces 26 and 18 being substantially perpendicular to said transmitted or reflected beam on the path on which it is situated.

In order to obtain said oblique face 4, the block is constituted by two prisms 8 and 10. Both of the prisms are made of the same glass which is selected so as to have no birefringence. The prism 8 includes said inlet face 12 which is perpendicular to said direction of incidence 14. The direction of incidence coincides with the direction of the incident beam 16 and is shown as being horizontal. This prism constitutes said substrate and bears the oblique face 4, and also has the reflection outlet face 18 which is preferably chosen to be perpendicular to said reflected beam 20 if the reflected beam is to be made of. Said polarizing stack 22 is formed on said oblique face. The prism 10 is fixed to the stack by a layer of glue 24. It has a transmission outlet face 26 which is preferably perpendicular to the transmitted beam 28 if the transmitted beam is to be made use of.

The layer of glue 24 has a refractive index which is close to and preferably intermediate between the refractive index of the low index polarizing layers and the refractive index of the substrate. The refractive index of the substrate is preferably intermediate between the refractives indices of the high and low index polarizing layers in the stack 22. The use of the terms "index" and "indices" in this application is the refractive index and refractive indices respectively. Antireflection layers (not shown) may be deposited on the inlet and outlet faces 12, 18, and 26.

Figure 2:
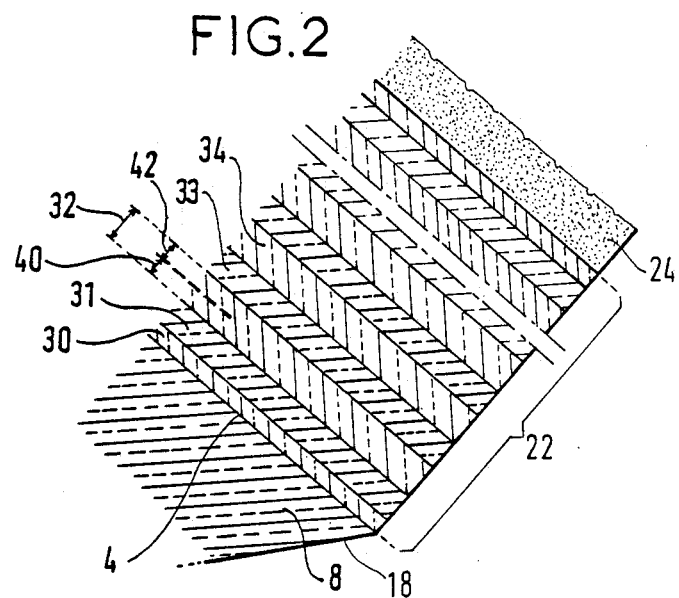
FIG. 2 shows a detail II of FIG. 1 on a larger scale.

As shown in FIG. 2, the polarizing stack 22 comprises, going from the oblique face 4 of the substrate 8: a half thickness low index layer 30; a high index layer 31; a full thickness low index layer 32; a high index layer 33; a full thickness low index layer 34; and so on in alternation up to a high index layer 35 which is followed by a half thickness low index terminal layer 36. Each full thickness low index layer such as 32 may be considered as being constituted by the sum of two half thickness low index layers such as 40 and 42 such that the stack 22 may be considered as being built up entirely from a succession of identical sequences each constituted by two half thickness low index layers such as 30 and 40 with a high index layer such as 31 sandwiched in between.

The thicknesses of the individual layers may vary randomly by as much as 10% without any substantial loss of effectiveness, providing the above-mentioned correct thickness for the basic sequence is satisfied to an accuracy of about 2% to 3%, at least on average over the full thickness of the stack.

Figure 3:
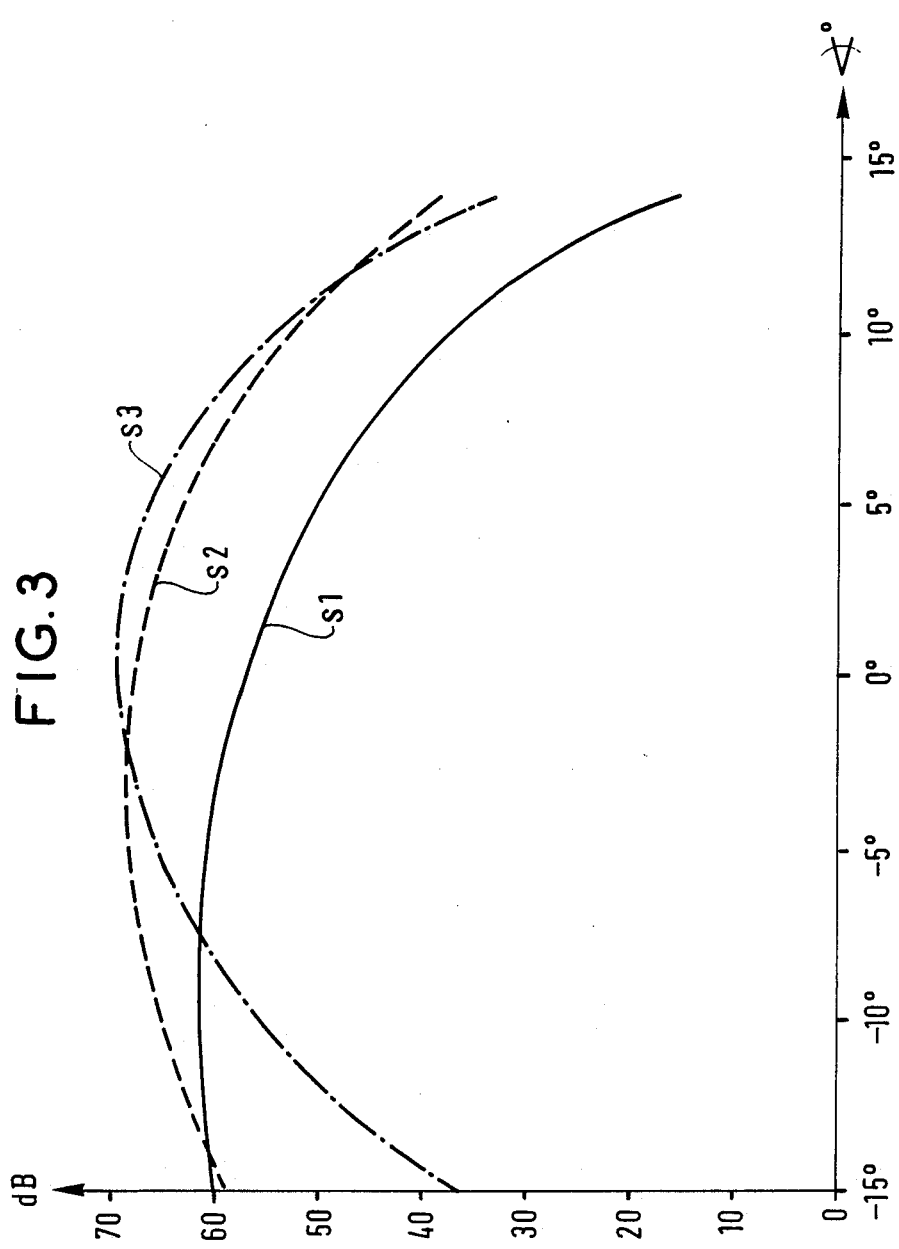
FIGS. 3 and 4 are transmittance plots, with FIG. 3 showing three curves for s polarized light and FIG. 4 showing three curves for p polarized light.
Figure 4:
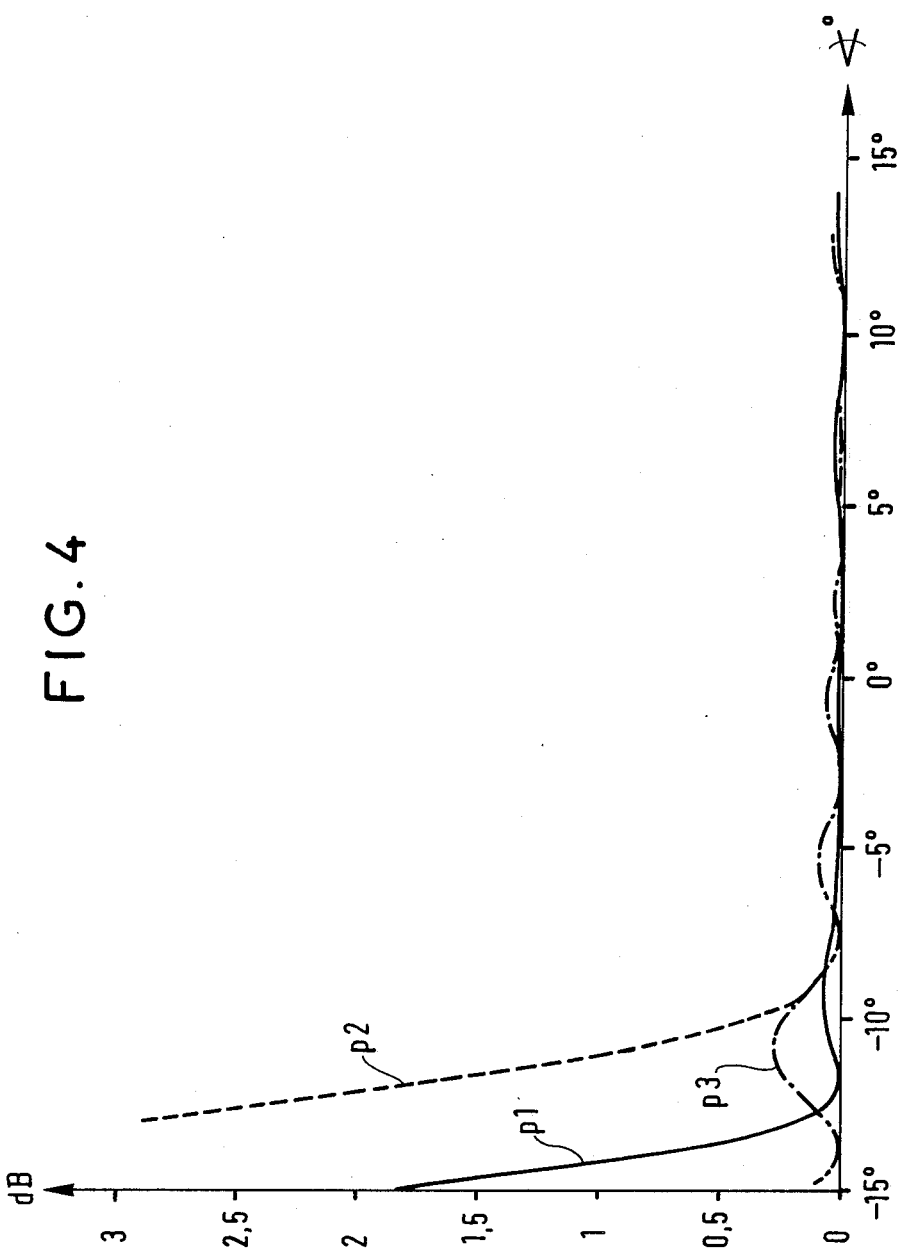

By way of indication, FIGS. 3 and 4 each show three transmittance plots s1, s2 & s3, and p1, p2, & p3 expressed in decibels for s and p polarized vibrations in the reflected and transmitted beams corresponding to three cases C1, C2, & C3 respectively having similar deposits. These deposits were designed for a wavelength taken as unity and made using the following materials:

$SiO_2$ for the low index polarizing layers ($n_B=1.45$);

$TiO_2$ for the high index polarizing layers ($n_H=2.2$); and glass for substrate ($n_0=1.7$), the glass being of the type D2050 from the French corporation Sovirel.

The angle between the inlet face 12 and the oblique face 4 of the prism 8 was 50°.

In case C1: $P=1$ $(ne)_B=0.1944$ and $(ne)_H=0.2596$
In case C2: $P=1.15$ $(ne)_B=0.2485$ and $(ne)_H=0.2237$
In case C3: $P=1.30$ $(ne)_B=0.3162$ and $(ne)_H=0.1789$
There were eleven base sequences.

In the plots, the angle in degrees between the propagation direction of the external inlet beam and the perpendicular to the inlet face 12 is plotted along the X axis. For example, when this inlet angle of incidence is equal to 10°, the above-mentioned angle of incidence $A_0$ which is an angle of incidence on the stack, is 55.86°.

I claim:

1. A dielectric layer polarizer comprising; a substrate having a face which is oblique to an incident light beam to be polarized, said polarizer further comprising a stack of alternating low and high refractive index dielectric layers on said oblique face, wherein said stack is symmetrical and begins and ends with respective half-thickness layers, said half thickness layers having a same refractive index and each having the thickness of the other layers of the stack which have the same refractive index.

2. A dielectric layer polarizer for polarizing light having a wavelength, said polarizer comprising:
   inlet means for forming or transmitting an incident beam which is constituted by said light and whose rays propagate along directions close to a predetermined direction of incidence;
   a transparent substrate having a face on the path of said incident beam, said face being oblique relative to said direction of incidence; and
   a polarizing stack formed on said oblique face and constituted by thin dielectric layers, said layers being first and second refractive index polarizing layers presenting a first refractive index and a second refractive index for said light and following one another in alternation starting from said oblique face and having different thicknesses, with the succession of said layers being in the form of a periodic succession of base sequences, each of which is constituted by a plurality of thin dielectric layers alternating between said first and second refractive indices, said sequences being identical to each other with respect to their refractive indices and the thicknesses of the layers which constitute them;
   said direction of incidence forming an angle of incidence with the direction perpendicular to said oblique face and to said polarizing layers, said angle of incidence being situated in a plane of incidence and having a value relative to said wavelength and to said refractive indices and thicknesses of the polarizing layers such that said polarizing stack separates said incident beam into a transmitted beam and a reflected beam with crossed polarizations;
   wherein said base sequence is a symmetrical sequence constituted by one of said second index polarizing layers having a second index optical thickness, and two mutually identical half-thickness first index layers situated on either side of said second index layer and each of them having a first index optical thickness which is half said second optical thickness, such that pairs of said half-thickness first index layers combine at each interface between two consecutive base sequences in order to form one of said first index polarizing layers which is of full thickness.

3. A polarizer according to claim 2, in which said first and second indices are low and high indices respectively, wherein a base thickness W is given in terms of a low index proportion P, by the equation:

$$1/W = 1.92 - 0.77P;$$

said base thickness W comprising a total relative thickness $W_1/W_0$ and being equal to the ratio of the total optical thickness $W_1 = 2ne_B + ne_H$ of said base sequence divided by a reference thickness $W_0$; wherein $ne_B$ and $ne_H$ are the respective optical thicknesses of low and high index layers in the base sequence of said polarizer;

said low index proportion P being a relative proportion $P_1/P_0$ of the low index optical thicknesses deduced from the total proportion $P_1 = 2ne_B/(2ne_B + ne_H)$ of the optical thicknesses $2ne_B$ of said low index layers in the optical thickness $(2ne_B + ne_H)$ of said base sequence, and being equal to the ratio $P_1/P_0$ of said total proportion $P_1$ divided by a reference proportion $P_0$;

said reference thickness $W_0$ and said reference proportion $P_0$ being defined by a reference polarizer which is one of said thin layer polarizers in which high refractive index polarizing layer and said full thickness refractive index polarizing layer are quarterwave layers for said light and for said angle of incidence of said incident beam on said face on the path of said incident beam, said reference thickness $W_0$ and said reference proportion $P_0$ being the total optical thickness $(2ne_{BO}+ne_{HO})$ and the total proportion of the low index optical thicknesses $2ne_{BO}/(2ne_{BO}+ne_{HO})$, respectively, in said base sequence of said reference polarizer.

4. A polarizer according to claim 3, wherein said low index proportion P lies in the range 0.8 to 1.5.

5. A polarizer according to claim 4, wherein said angle of incidence lies in the range 20° to 70°.

6. A polarizer according to claim 2, in the form of a transparent block in which said oblique face and said polarizing stack are embedded, said block comprising:

an inlet face substantially perpendicular to said direction of incidence in order to constitute said inlet means transmitting said incident beam into said block;

a transmission outlet face situated on the path of said transmitted beam; and a reflection outlet face situated on the path of said reflected beam;

at least one of said outlet faces being substantially perpendicular to said transmitted or reflected beam on whose path it is situated.

* * * * *